Patented May 17, 1932

1,858,272

UNITED STATES PATENT OFFICE

LESLIE G. JENNESS, OF NEW YORK, N. Y., ASSIGNOR TO INTERMETAL CORPORATION, OF NEW YORK, N. Y., A CORPORATION OF DELAWARE

TREATMENT OF BAUXITE, CLAY, AND INTERMEDIATE ALUMINUM BEARING ORES

No Drawing.   Application filed August 9, 1929.   Serial No. 384,809.

In my copending application Serial No. 364,340, filed May 18th, 1929, I have described and claimed a general method of selectively volatilizing the various metals contained in an ore and separately recovering each metal as the chloride. The method described and claimed in my said copending application comprises the steps of selective reduction and simultaneous chlorination and volatilization in the presence of sulphur chlorides and chlorine, at regulated temperatures. By this method each metal in an ore is separately recovered as chloride at a given predetermined temperature which is distinct from the temperature at which each other metal is recovered.

Certain ores, however, while they yield to the reduction, chlorination and volatilization process described and claimed in my said copending application, may be so treated prior to being subjected to the action of the sulphur chlorides and chlorine, that the yield of the metallic constituents will be very markedly improved.

Aluminum bearing ores, among others, are of this description. Ores of this latter type include not only bauxite, but kaolin, clay and ores intermediate between clay and bauxite. In some of these ores the aluminum compound is predominantly aluminum oxide; in others, it is predominantly aluminum silicate. Many, however, contain both the oxide and the silicate of aluminum and some even have, in addition to these aluminum compounds a percentage of free silica. All generally have other metals such as iron, titanium and, in some cases, vanadium and other metallic constituents in composition. Also, these aluminum ores are generally hydrated, the percentage of water of composition being greater or less as the ores are "fat" or "lean".

Bauxite, for example, contains, in addition to the oxides of aluminum ($Al_2O_3$), varying proportions of ferric oxide ($Fe_2O_3$) and titanium oxide ($TiO_2$). These constituents, when the ore in its natural form is subjected to the sulphur chloride and chlorine process of my said copending application, are all volatilized at comparatively low temperatures. Aluminum in the natural ore will volatilize below 300° C. and iron and titanium go off at somewhat lower temperatures. For this reason, the differences between the volatilization temperatures of these constituents are so small that there is danger, if the greatest care is not used, that there will be a recovery of impure materials. The aluminum, for instance, may be contaminated with iron or titanium or both.

I have discovered, however, that if aluminum ores, such as bauxite and others, are ignited previously to being treated with the sulphur chlorides and chlorine, all the metallic constituents are rendered more refractory to action of these gases when subjected thereto. In other words, the volatilization temperatures of all are raised materially and, moreover, there is a greater spread between these temperatures so that one may more easily be recovered separately from the others.

I have discovered, further, that there is a very important time element in the ignition process. If, for example, the bauxite be ignited at about 1000° C., constantly maintained, there is a very marked increase in the refractory nature of the metallic constituents over that of the natural ore. After this ignition treatment the aluminum, for example, volatilizes when later treated with sulphur chlorides and chlorine, at about 450° C.

This effect is very greatly increased, however, if instead of immediately subjecting the natural ore to a temperature of 1000° C. and constantly maintaining it at that temperature throughout the ignition treatment, an initial temperature of 200° C. to 300° C. is employed and this is slowly raised to 900° C. over an extended period of time. The period of time of this ignition will depend upon the particular ore. As a result of this ignition method, the valuable metallic constituents of the ore are rendered more refractory to the subsequent treatment and a wider spread between the volatilization temperatures under that treatment is imparted.

Under the slow ignition process of the present invention followed by the sulphur chloride and chlorine treatment, iron and titanium both begin to be reduced, chlorinated and volatilized at temperatures below 450° C., while aluminum is not reduced, chlorinated and volatilized before 500° C. to 550° C. is reached.

The result, which is quite remarkable, is such as to permit the reduction, chlorination and volatilization of each metallic constituent of the ore at a temperature sufficiently far removed from that of the other metallic constitutents that there is little or no danger that one will be contaminated with the other. Regardless of the ore used, however, I prefer that the first temperature applied to the pulverized ore in this preliminary slow ignition should be that at which water is released in appreciable quantities. The temperature should then be raised slowly, allowing ample time for substantially complete elimination of the combined water. Owing to the fact that different aluminum ores contain varying quantities of water differently combined, no definite rule can be laid down for the length of time required for best results, although it may be characterized by the fact that when subjected subsequently to treatment with sulphur chlorides and chlorine, there is a wide spread particularly between the temperatures at which aluminum oxide ($Al_2O_3$) will be reduced, chlorinated and volatilized and that at which ferric oxide ($Fe_2O_3$) and titanium oxide ($TiO_2$) will be similarly disposed of.

An example may be given for a bauxite ore containing 27 percent combined water and, in addition to silica, approximately 12 percent titanium oxide ($TiO_2$) and 4 percent ferric oxide ($Fe_2O_3$). This ore in pulverized form is first ignited at 300° C. and the temperature is slowly raised until about 900° C. is reached. After this ignition treatment, the ore is then placed in a furnace heated to about 400° C. to 450° C. and sulphur chlorides and chlorine are passed over it. Between these temperatures substantially all the iron and titanium are reduced, chlorinated and volatilized while none of the aluminum has been affected by the gases.

The temperature is then raised to 600° C. or 700° C., while the gases are still passing over. At about 500° C. the aluminum begins to volatilize and at 700° C., volatilization proceeds with great rapidity. The aluminum is thus recovered in substantially pure form, the iron and titanium being present, if at all, only in negligible quantities. Aluminum chloride of over 99 percent purity has been recovered by this method of the present invention.

The iron and titanium may be chlorinated and volatilized separately or together in the manner described in my aforesaid copending application. In either case they will be volatilized at the temperatures above indicated without any aluminum being volatilized. Also as is well known iron and titanium may be easily separated by volatilization or by wet methods at present in use.

The effect hereinabove described which is produced by the preliminary ignition treatment may be directly ascribable to the water of composition content of the ore. It is probable that in highly hydrated ores the molecule is much heavier than in those having lesser degree of hydration and that when the ore is ignited slowly from low temperatures up to higher temperatures, a more thorough and possibly different decomposition takes place than occurs when the ore is rapidly ignited at high temperatures.

I have, indeed, found that different aluminum ores and even different natural bauxites exhibit slightly different degrees of refractivity when apparently treated in the same manner. This is not surprising after observing the great difference of refractivity between a natural bauxite and the same bauxite after ignition in the manner described. It is apparently the case that ignition not only drives off the water but also changes the molecular structure of the aluminum compound.

While it is true, as stated above, that no definite rule can be laid down for the time during which the ignition should be carried on and for the temperatures at which it should be conducted, nevertheless, certain general rules can be stated both for time and temperature. Where, for instance, the temperatures of ignition are low, the temperature working range of volatilization with sulphur chlorides and chlorine is narrow. It can also be stated that the temperature working range of the sulphur chloride and chlorine treatment is increased by decreasing the rate of temperature increase during the ignition treatment and by increasing the ultimate ignition temperature.

It is of course frequently the practice to ignite hydrated ores to drive off the water of composition for the reason that unless this is done, the ultimate recovered product may be of a syrupy, sticky nature and difficult to handle. I believe that it is new in the art to ignite the ore in the manner described in the present specification for the purpose of rendering the valuable metallic constituents of the ore more refractory to the effect of sulphur chlorides and chlorine and to procure a wider spread between the temperatures of chlorination and volatilization of such constituents.

The process of this invention is applicable to other aluminum ores than bauxite. It can be employed in the recovery of aluminum and other metallic constituents from clays and from intermediate ores between clay and bauxite. Kaolin or even ordinary clay containing a large percentage of aluminum silicate yield readily to the process.

When kaolin is properly ignited in the manner described it is found that the aluminum silicate is not reduced, chlorinated and volatilized until temperatures in the region of 750° C. to 850° C. are reached. The iron, titanium and vanadium, if present, will, however, be volatilized at far lower temperatures. Clays, however, are likely to have in addition to aluminum silicate, certain percentages of aluminum oxides and frequently free silica. The period of the ignition treatment applied to clays may be of greater or less duration depending on whether or not the clay is "fat" or "lean". The temperatures of ignition used, however, should be preferably from 300° C. to 900° C. After the clay has been so ignited, I have found that the iron and titanium and aluminum oxide, if present, come off at approximately the same temperatures as in the case of bauxite when the clay is subjected to the action of sulphur chlorides and chlorine. The temperatures should, however, be raised to 750° C. or above, at which point the aluminum silicate begins to break down and the aluminum to become chlorinated and volatilized. Between 800° C. and 850° C. the volatilization is extremely rapid.

I do not wish to be limited to the exact details above indicated as desirable in the specific example given as an illustration of the process, and considerable variation is possible without departing from the spirit and scope of the invention described.

What I claim is:—

1. The process of separating aluminum from bauxite which comprises pulverizing the bauxite; then first igniting it at a temperature of 300° C. and gradually increasing the ignition temperature to about 900° C., thereby slowly driving off substantially all the water of composition; then passing over said bauxite at a temperature of 400° C. to 450° C., sulphur chlorides and chlorine until substantially all iron and titanium are chlorinated and volatilized; then raising the temperature of the ore while the said gases are still passing over it to temperatures between 600° C. and 700° C., thereby chlorinating, volatilizing and recovering as chloride the aluminum content of said bauxite in substantially pure form.

2. The process of separating aluminum from clay which comprises pulverizing the clay; then, first, igniting it at a temperature of 300° C. and gradually increasing the ignition temperature to about 900° C., thereby slowly driving off substantially all the water of composition; then passing over said clay at a temperature of 400° C. to 450° C., sulphur chlorides and chlorine until substantially all iron and titanium are chlorinated and volatilized; then raising the temperature of the ore while said gases are still passing over it to temperatures between 600° C. and 700° C., thereby reducing, chlorinating and volatilizing the aluminum oxide content of said clay; then continuing to heat the clay to between 750° C. and 850° C. thereby reducing, chlorinating and volatilizing the aluminum contained in the aluminum silicate in said clay.

3. The process of separating aluminum from aluminum ores which comprises pulverizing the ore; then first igniting the ore so pulverized to the temperature at which water begins to be released in appreciable quantities; then gradually increasing the temperature of ignition until the combined water is substantially eliminated; then passing over said ore at a temperature of 400° C. to 450° C. sulphur chlorides and chlorine until substantially all the iron and titanium are chlorinated and volatilized; then raising the temperature of the ore while said gases are still passing over it to temperatures of between 600° C. and 700° C. or higher, thereby reducing, chlorinating and volatilizing and recovering as chloride the aluminum content of said ore in substantially pure form.

4. The process of separating aluminum from aluminum ores which comprises pulverizing the ore; then igniting it at a gradual increase in temperature within the range of between about 300° C. and 900° C. thereby slowly driving off substantially all of the water of composition; then passing over said ore at a temperature of 400° C. to 450° C. sulphur chlorides and chlorine until substantially all the iron and titanium are chlorinated and volatilized; then raising the temperature of the ore while said gases are still passing over it to temperatures of between 600° C. and 700° C. or higher thereby reducing, chlorinating and volatilizing the aluminum content of said ore in substantially pure form.

5. The process of separating aluminum from bauxite which comprises pulverizing the bauxite; then igniting it at a gradual increase in temperature within the range of between about 300° C. and 900° C., thereby slowly driving off substantially all of the water of composition; then passing over said bauxite at a temperature of 400° C., sulphur chlorides and chlorine until substantially all iron and titanium are chlorinated and volatilized; then raising the temperature of the ore while the gases are still passing over it to temperatures between 600° C. and 700° C., thereby chlorinating, volatilizing and recovering as chloride the aluminum content of said bauxite in substantially pure form.

In testimony whereof, I have hereunto set my hand this 5th day of August, 1929.

LESLIE G. JENNESS.